(12) United States Patent
Kim et al.

(10) Patent No.: US 8,107,013 B2
(45) Date of Patent: Jan. 31, 2012

(54) FREQUENCY DEMODULATOR FOR RECOVERING SECAM CHROMINANCE SIGNAL AND METHOD THEREOF

(75) Inventors: Hyo-Ju Kim, Yongin-si (KR); Seong-Won Lee, Seongnam-si (KR); Do-Gyun Kim, Seoul (KR); Yun-Sung Wang, Seoul (KR); Ji-Hoon Jang, Younin-si (KR)

(73) Assignee: Nextchip Co., Ltd., Seoul (KR)

( * ) Notice: Subject to any disclaimer, the term of this patent is extended or adjusted under 35 U.S.C. 154(b) by 1203 days.

(21) Appl. No.: 11/889,647

(22) Filed: Aug. 15, 2007

(65) Prior Publication Data
US 2008/0049144 A1    Feb. 28, 2008

(30) Foreign Application Priority Data

Aug. 23, 2006   (KR) .................. 10-2006-0080056

(51) Int. Cl.
*H04N 9/66* (2006.01)
(52) U.S. Cl. ..................... 348/639; 348/641
(58) Field of Classification Search .................. 348/638, 348/639, 641
See application file for complete search history.

(56) References Cited

U.S. PATENT DOCUMENTS

| 6,215,528 B1* | 4/2001 | Lin et al. ............ 348/641 |
| 2005/0117065 A1* | 6/2005 | Cookman et al. ...... 348/663 |
| 2006/0109379 A1* | 5/2006 | Ahn et al. ............ 348/491 |

FOREIGN PATENT DOCUMENTS

JP        10-160773        6/1998

OTHER PUBLICATIONS

Office Action dated Aug. 24, 2007 from the Korean Patent Office for priority Application No. 10-2006-0080055.

* cited by examiner

*Primary Examiner* — Andrew Koenig
*Assistant Examiner* — Jason J Chung
(74) *Attorney, Agent, or Firm* — Nixon & Vanderhye PC

(57) ABSTRACT

An apparatus for recovering a chrominance signal from a sequential color with memory (SECAM) composite video baseband signal (CVBS), and more particularly, to a frequency demodulator and method of recovering a SECAM chrominance signal which can utilize both a real number portion and an imaginary number portion, and generate a frequency-demodulated chrominance signal using an arctangent approximation, and thereby can simplify a circuit configuration of a frequency demodulator to perform a fixed-point calculation is provided. A frequency demodulator for recovering a chrominance signal, the frequency demodulator comprises a phase differentiator generating a phase difference component between neighboring samples from an input signal and a phase estimator calculating a phase difference between the neighboring samples by using an arctangent approximation, based on the generated phase difference component, wherein the frequency demodulator generates a frequency-demodulated chrominance signal and the phase difference corresponds to the chrominance signal.

11 Claims, 9 Drawing Sheets

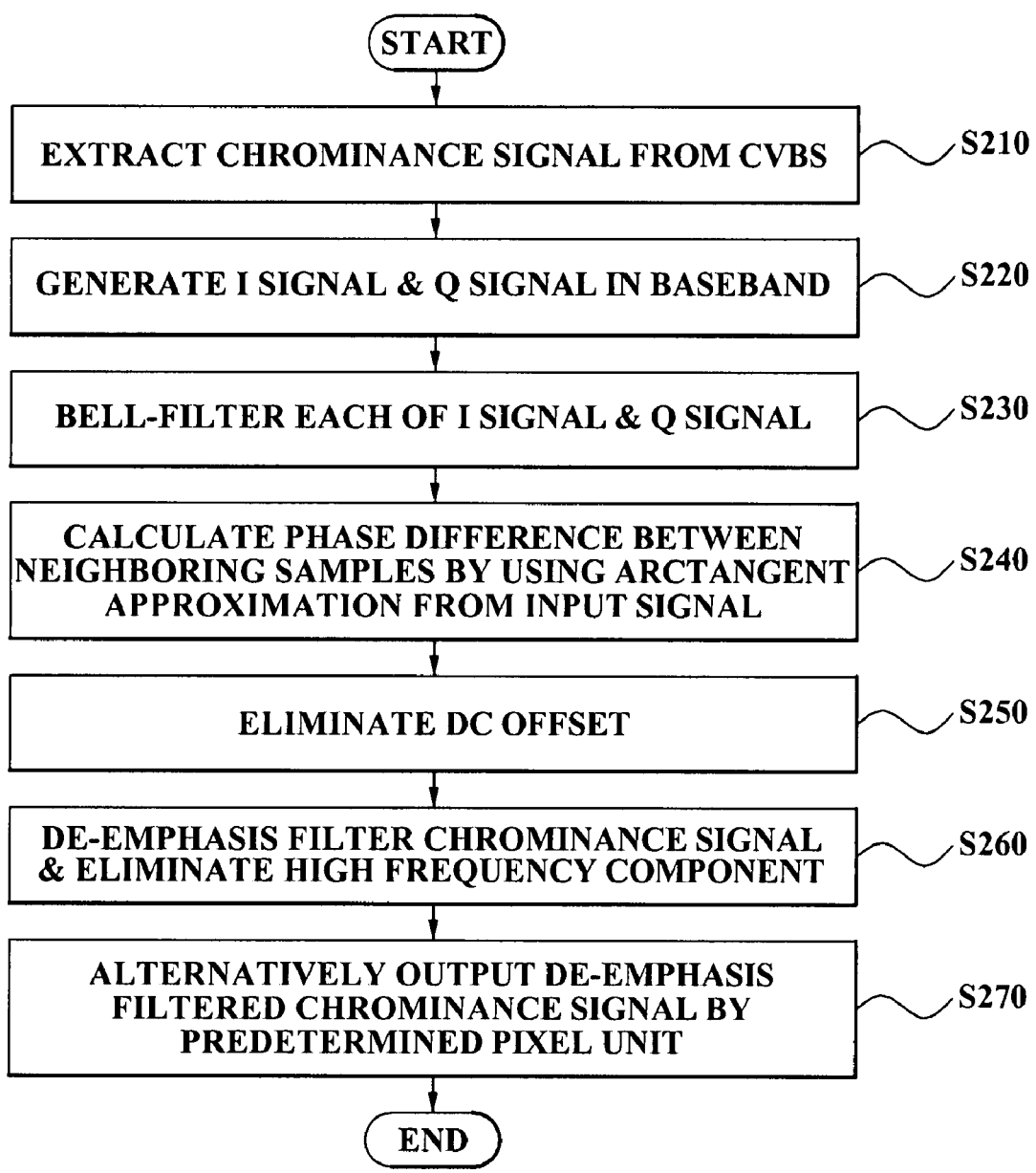

FREQUENCY DEMODULATOR FOR RECOVERING SECAM CHROMINANCE SIGNAL AND METHOD THEREOF

CROSS-REFERENCE TO RELATED APPLICATION

This application claims the benefit of Korean Patent Application No. 10-2006-0080056, filed on Aug. 23, 2006, in the Korean Intellectual Property Office, the disclosure of which is incorporated herein by reference.

BACKGROUND OF THE INVENTION

1. Field of the Invention

The present invention relates to an apparatus for recovering a chrominance signal from a sequential color with memory (SECAM) composite video baseband signal (CVBS), and more particularly, to a frequency demodulator and method of recovering a SECAM chrominance signal to simplify a circuit configuration of a frequency demodulator and thereby perform a fixed-point calculation.

2. Description of Related Art

Generally, a composite video baseband signal (CVBS) is generated by synthesizing a video signal, a synchronizing signal, and the like, into a single signal. In this instance, the video signal contains encoding information which is needed to form video, and the synchronizing signal indicates display timing on a screen. Standards of the CVBS include National Television System Committee (NTSC), Phase Alternating Line (PAL), sequential color with memory (SECAM), and the like.

SECAM is a standard which was developed in France and was first used in broadcasting in the year 1967. Also, while NTSC and PAL utilize an amplitude modulation (AM) scheme for the color signal modulation technique, SECAM utilizes a frequency modulation (FM) scheme for a color signal modulation scheme.

SECAM constructs one scene with 625 scanning lines, transmits 25 scenes per second, and transmits 50 fields at the interlaced scanning of 2:1. Also, the bandwidth of $D_R$ and $D_B$ corresponding to chrominance signal components is limited to about 1.3 MHz. In order to prevent mutual interference between the chrominance signal components $D_R$ and $D_B$, when transmitting a frequency-modulated chrominance signal component, SECAM alternatively transmits the chrominance signal components $D_R$ and $D_B$ every time a scanning line is changed.

An apparatus for recovering a chrominance signal from a CVBS, which is transmitted by a SECAM scheme, needs to calculate an arctangent in order to calculate a phase difference via a frequency demodulator. Schemes of approximating an arctangent function include various types of schemes, for example, a scheme of utilizing a Coordinate Rotation Digital Computer (CORDIC), a scheme of utilizing a lookup table, and the like.

However, in a conventional art, an apparatus for demodulating a SECAM CVBS approximates an arctangent function using a CORDIC or a lookup table to calculate a phase difference using a frequency demodulator. Accordingly, a process of calculating the phase difference is complex, which results in complicating a circuit configuration of the frequency demodulator.

BRIEF SUMMARY

An aspect of the present invention provides a frequency demodulator and method of demodulating a sequential color with memory (SECAM) chrominance signal which can utilize both a real number portion and an imaginary number portion, and generate a frequency-demodulated chrominance signal using an arctangent approximation, and thereby can simplify a circuit configuration of a frequency demodulator to perform a fixed-point calculation.

According to an aspect of the present invention, there is provided a frequency demodulator for generating a frequency-demodulated chrominance signal including: a phase differentiator generating a phase difference component between neighboring samples from an input signal; and a phase estimator calculating a phase difference between the neighboring samples by using an arctangent approximation, based on the generated phase difference component, wherein the phase difference corresponds to the chrominance signal.

According to another aspect of the present invention, there is provided a method of demodulating a chrominance signal, the method including: generating a phase difference component between neighboring samples from an input signal; and calculating a phase difference between the neighboring samples by using arctangent approximation, based on the generated phase difference component, wherein the frequency demodulation method generates a frequency-demodulated chrominance signal and the phase difference corresponds to the chrominance signal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a flowchart illustrating a method of recovering a SECAM chrominance signal according to an exemplary embodiment of the present invention;

DETAILED DESCRIPTION OF EMBODIMENTS

Figure 1:
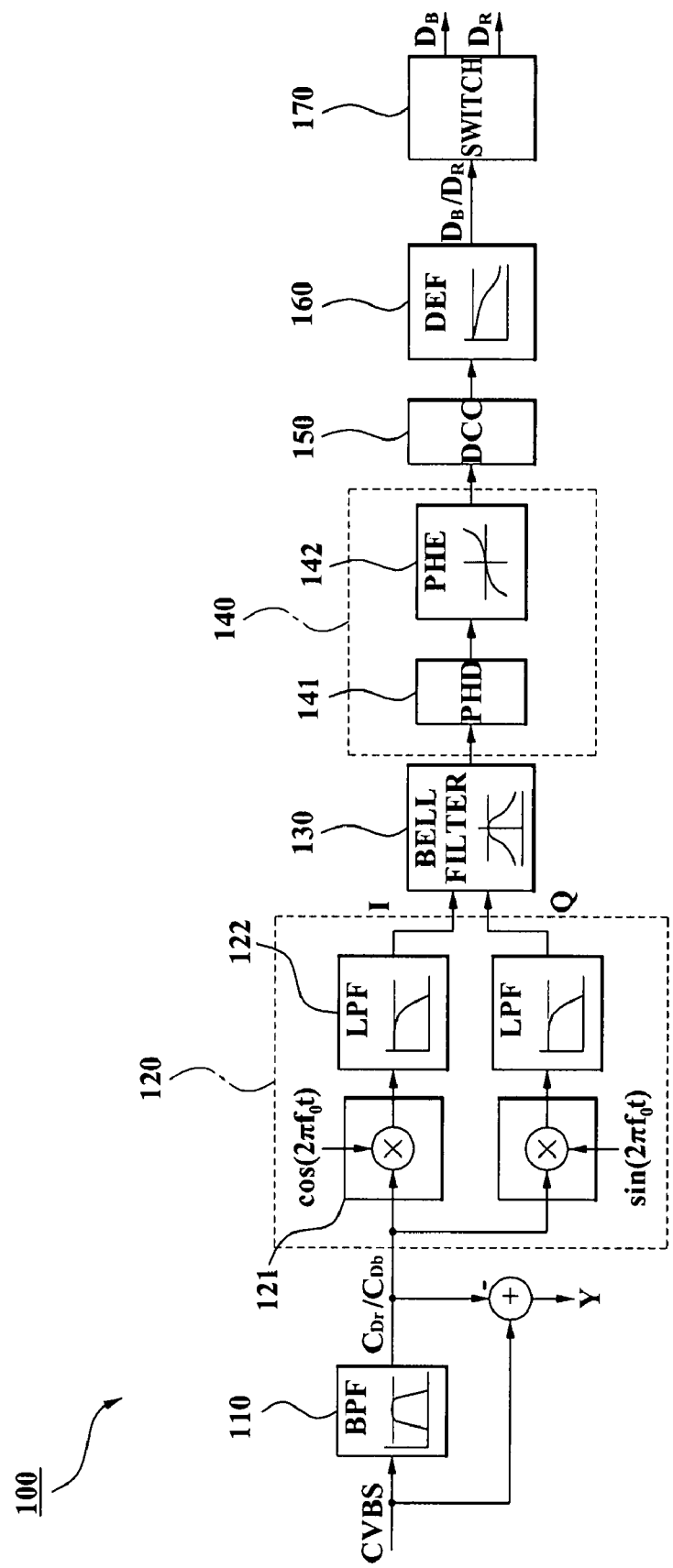
FIG. 1 is a block diagram illustrating a configuration of an apparatus for recovering a SECAM chrominance signal according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a frequency demodulator 100 for recovering a sequential color with memory (SECAM) chrominance signal according to an exemplary embodiment of the present invention.

As shown in FIG. 1, the frequency demodulator 100 for recovering a SECAM chrominance signal according to the present exemplary embodiment includes a band pass filter (BPF) 110, a frequency down-converter 120, a bell filter BCF 130, a frequency demodulator 140, a direct current (DC) compensation unit 150, a de-emphasis filter (DEF) 160, and a switch 170. In this instance, the frequency demodulator 140 calculates a phase difference between neighboring samples by using an arctangent approximation from an input signal.

The BPF 110 outputs a frequency modulated chrominance signal $C_{Db}$ or $C_{Dr}$ from an inputted composite video baseband signal (CVBS). In this instance, $C_{Db}$ corresponds to a chrominance signal of a SECAM standard which includes blue color information, and $C_{Dr}$ corresponds to a chrominance signal of the SECAM standard which includes red color information. Even though not included in the spirit of the present invention, when the chrominance signal $C_{Db}$ or $C_{Dr}$ is eliminated from the CVBS, a luminance signal Y may be outputted. The frequency down-converter 120 down-converts a frequency of the chrominance signal $C_{Db}$ or $C_{Dr}$, which is outputted via the BPF 110, and thereby generates an in-phase (I) signal and a quadrature phase (Q) signal in a baseband. In this instance, the frequency down-converter 120 includes a first multiplier 121 and a low pass filter (LPF) 122. The first multiplier 121 multiplies the chrominance signal $C_{Db}$ or $C_{Dr}$, which is separated via the BPF 110, with each of cos ($2f_0$) and sin ($2f_0t$), and outputs results of the multiplications. Also, the LPF 122 eliminates a high frequency component of the signals, outputted via the first multiplier 121, and thereby outputs the I signal and Q signal in the baseband. In this instance, $f_0$ indicates a mean frequency, for example, 4.286 MHz, of the chrominance signal $C_{Db}$ or $C_{Dr}$.

The bell filter 130 bell-filters each of the I signal and the Q signal which are generated via the frequency down-converter 120, and constantly envelopes the amplitude of the I signal and the Q signal and thereby outputs a single constant-enveloped signal.

The frequency demodulator 140 calculates a phase difference between the neighboring samples by using the arctangent approximation from the signal outputted via the bell filter 130. Specifically, the frequency demodulator 140 calculates the chrominance signal $C_{Db}$ or $C_{Dr}$. Also, the frequency demodulator 140 includes a phase differentiator (PHD) 141 and a phase estimator (PHE) 142. The phase differentiator 141 generates a phase difference component from an signal output from the bell filter 130, and the phase estimator 142 calculates the phase difference by using an arctangent approximation based on the generated phase difference component.

The DC compensation unit 150 eliminates a DC offset from the chrominance signal $C_{Db}$ or $C_{Dr}$, outputted via the frequency demodulator 140. Also, the DEF 160 de-emphasis filters the chrominance signal in which the DC offset is eliminated by the DC compensation unit 150, and also eliminates a high frequency component from the chrominance signal.

A method of recovering a SECAM chrominance signal according to an exemplary embodiment of the present invention, as constructed as described above, will be described with reference to FIG. 2.

FIG. 2 is a flowchart illustrating a frequency demodulation method of recovering a SECAM chrominance signal according to an exemplary embodiment of the present invention.

As shown in FIG. 2, the frequency demodulation method of recovering a SECAM chrominance signal according to the present exemplary embodiment includes operation S210 of extracting a frequency-modulated chrominance signal from an inputted CVBS; operation S220 of generating an I signal and a Q signal in a baseband; operation S230 of bell-filtering each of the I signal and the Q signal; operation S240 of calculating a phase difference between neighboring samples by using an arctangent approximation from an input signal; operation S250 of eliminating a DC offset; operation S260 of de-emphasis filtering the chrominance signal from which the DC offset is eliminated and thereby eliminating a high frequency component; and operation S270 of alternatively outputting the de-emphasis filtered chrominance signal by a predetermined pixel unit.

Hereinafter, the frequency demodulation method of recovering the SECAM chrominance signal according to the present exemplary embodiment will be described in detail.

When a transmitting side transmits chrominance signals by using a SECAM scheme, the transmitting side performs a low frequency pre-emphasis with respect to a chrominance signal component $D_R$ or $D_B$ to be transmitted for improvement of a signal-to-noise ratio (SNR), via a low frequency pre-emphasis filter, which may be represented as $$D_R^* = A_{BF}(f)D_R \quad A_{BF}(f) = \frac{1 + j(f/f_1)}{1 + j(f/3f_1)} \qquad \text{[Equation 1]}$$
$$D_B^* = A_{BF}(f)D_B$$

In this instance, f indicates an instantaneous subcarrier frequency, and $f_1$ indicates 85 KHz.

Also, the receiving side may acquire a frequency-modulated chrominance component by performing a frequency modulation with respect to signals acquired from Equation 1 above, and also performing a high frequency pre-emphasis via a high frequency pre-emphasis filter, for example, an anti-bell filter, may be represented as $$G(f) = M_0 \frac{1 + j16F}{1 + j1.26F}, \quad F = \frac{f}{f_0} - \frac{f_0}{f} \qquad \text{[Equation 2]}$$

In this instance, f indicates an instantaneous subcarrier frequency, $f_0$ indicates 4.286 KHz, and $M_0$ indicates 23+/−2.5%.

A receiving side receives the SECAM CVBS $E_M$. In this instance, the CVBS $E_M$ may be represented as a luminous signal component $E_Y'$ and a frequency modulated chrominance signal component as shown in Equation 3 and Equation 4 below. Particularly, the chrominance signal components $D_R$ and $D_B$ alternatively utilize scanning lines and thus may be respectively represented as $$E_M = E_Y' + G\cos 2\pi\left(f_{OR}'t + \Delta f_{OR}\int_0^\tau D_R^*(\tau)d\tau\right), \qquad \text{[Equation 3]}$$

and $$E_M = E_Y' + G\cos 2\pi\left(f_{OB}'t + \Delta f_{OB}\int_0^\tau D_B^*(\tau)d\tau\right). \qquad \text{[Equation 4]}$$

In this instance, $f_{OR}$ indicates a subcarrier frequency of the chrominance signal component $D_R$, and $\Delta f_{OR}$ indicates a frequency shift of the chrominance signal component $D_R$, $D_R^*(\tau)$ indicates a low frequency pre-emphasis filtered chrominance signal component $D_R$, $f_{OB}$ indicates a subcarrier frequency of the chrominance signal component $D_B$, and $\Delta f_{OR}$ indicates a frequency shift of the chrominance signal component $D_B$, $D_B^*(\tau)$ indicates a low frequency pre-emphasis filtered chrominance signal component $D_B$, and G indicates 231RE/2. IRE indicates Institute of Radio Engineers, and is a unit to define a signal with a video size. 100IRE indicates a signal of 714 mV.

In operation S210, the BPF 100 may calculate the frequency modulated chrominance signal from the inputted CVBS $E_M$. Generally, in a SECAM scheme, a correlation between CVBS $E_M$ and a neighboring line is comparatively low. Accordingly, the frequency modulated chrominance signal may be extracted using a horizontal filter, for example, the BPF 100 or a notch filter. Hereinafter, a frequency response characteristic of the horizontal filter will be described with reference to FIGS. 3A and 3B.

Figure 3A:
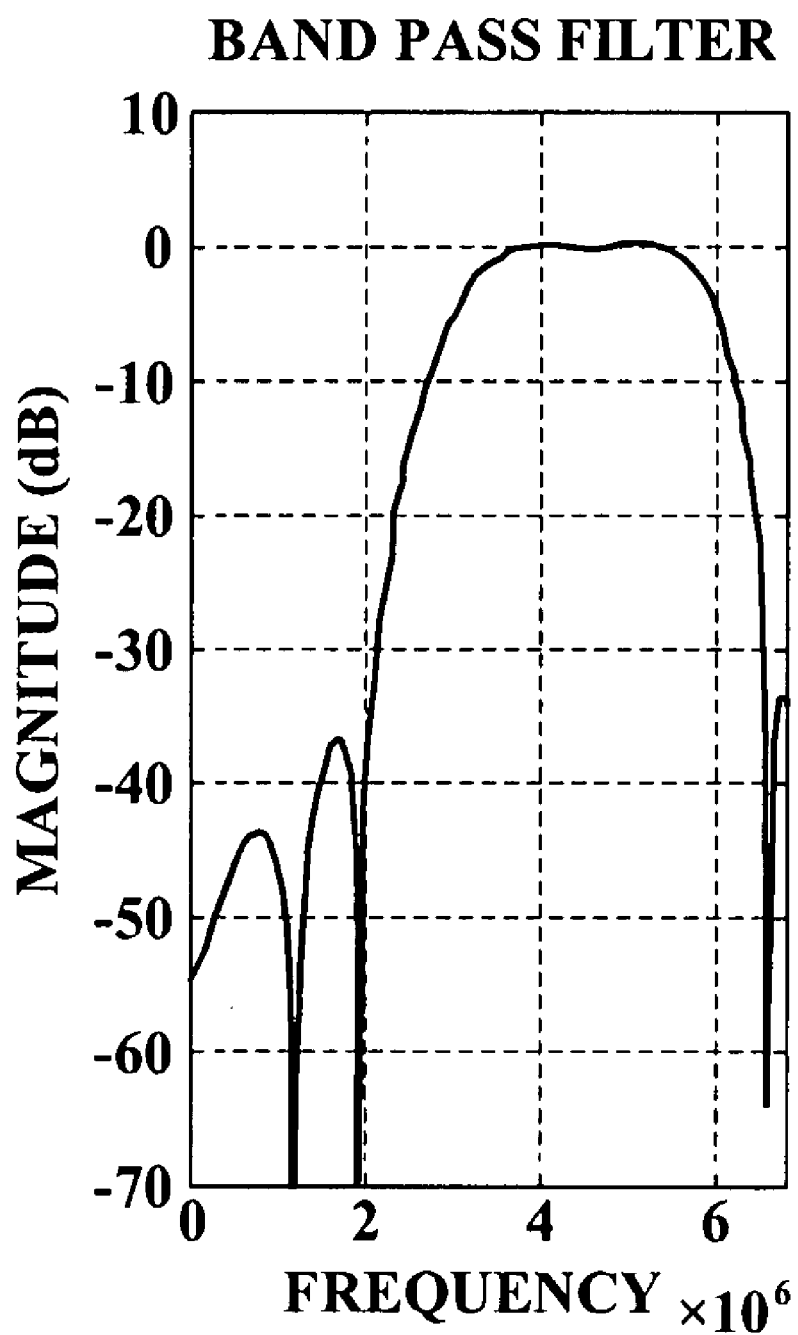
FIGS. 3A and 3B are graphs illustrating a frequency response characteristic of a horizontal filter according to an exemplary embodiment of the present invention.
Figure 3B:
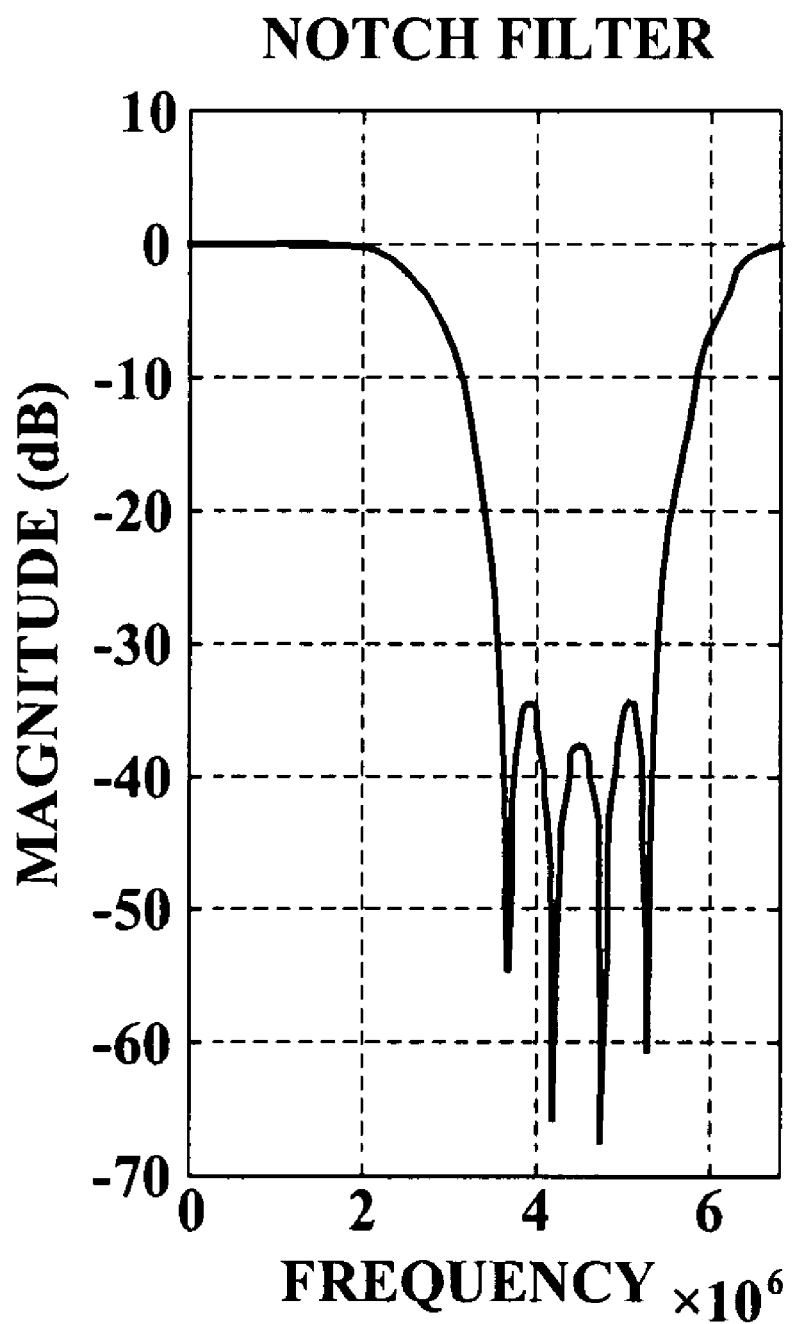

FIGS. 3A and 3B are graphs illustrating a frequency response characteristic of a horizontal filter according to an exemplary embodiment of the present invention.

As shown in FIGS. 3A and 3B, according to the frequency response characteristic of the horizontal filter, a BPF may be utilized to extract a chrominance signal from a CVBS $E_M$. Also, a notch filter may be utilized to extract a luminous signal from the CVBS $E_M$.

Chrominance signals $C_{Dr}$ and $C_{Db}$ of $D_R$ and $D_B$ lines, which are extracted via the BPF, are acquired through the same process, and thus only a process of acquiring the chrominance signal $C_{Dr}$ of the $D_R$ line will be described. In this instance, the chrominance signal $C_{Dr}$ of the $D_R$ line may be represented as $$C_{Dr} = G\cos 2\pi \left( f_{OR}t + \Delta f_{OR} \int_0^\tau D_R^* d\tau \right) \quad \text{[Equation 5]}$$

When m(t) is defined as shown in Equation 6 below, Equation 5 above may be briefly represented as Equation 7 below.

$$m(t) = 2\pi \Delta f_{OR} \int_0^\tau D_R^* d\tau \quad \text{[Equation 6]}$$

$$C_{Dr} = G\cos(2\pi f_{OR}t + m(t)) \quad \text{[Equation 7]}$$

In operation S220, the frequency down-coverter 120 down-converts the frequency of the extracted chrominance signal $C_{Dr}$, and thereby generates the I signal and the Q signal in the baseband. In this instance, the frequency down-converter 120 includes the first multiplier 121 and the LPF 122 as shown in FIG. 1. Accordingly, signals $C_{cdr}$ and $C_{sdr}$, which are acquired by multiplying cos ($2f_0t$) and sin ($2f_0t$) with the chrominance signal $C_{Dr}$ via the first multiplier 121, may be respectively represented as $$C_{cdr} = C_{Dr} \times \cos(2\pi f_0 t) \quad \text{[Equation 8]}$$
$$= \frac{G}{2} \begin{bmatrix} \cos(2\pi f_0 t + 2\pi f_{OR}t + m(t)) + \\ \cos(2\pi f_0 t - 2\pi f_{OR}t + m(t)) \end{bmatrix},$$

and $$C_{sdr} = C_{Dr} \times \sin(2\pi f_0 t) \quad \text{[Equation 9]}$$
$$= \frac{G}{2} \begin{bmatrix} \sin(2\pi f_0 t + 2\pi f_{OR}t + m(t)) + \\ \sin(2\pi f_0 t - 2\pi f_{OR}t + m(t)) \end{bmatrix}.$$

In order to eliminate the high frequency components of signals outputted via the first multiplier 121, the LPF 122 outputs baseband signals, that is, the I signal and the Q signal, which may be respectively represented as $$I = \frac{G}{2} C_r(t) \quad \text{[Equation 10]}$$
$$= LPF(C_{cdr})$$
$$= \frac{G}{2} \cos(2\pi(f_0 - f_{OR})t + m(t)),$$

and $$Q = \frac{G}{2} C_i(t) \quad \text{[Equation 11]}$$
$$= LPF(C_{sdr})$$
$$= \frac{G}{2} \sin(2\pi(f_0 - f_{OR})t + m(t)).$$

The bell filter 130 performs an inverse process of the high frequency pre-emphasis filter of the transmitting side. In this instance, the bell filter 130 is referred to as a cloche filter. In operation S230, the bell filter 130 bell-filters each of the I signal and the Q signal which are generated via the frequency down-converter 120, and constantly envelopes the amplitude of the I signal and the Q signal and thereby outputs a single constant-enveloped signal. Hereinafter, the frequency response characteristic of the bell filter 130 will be described with reference to FIG. 4.

Figure 4:
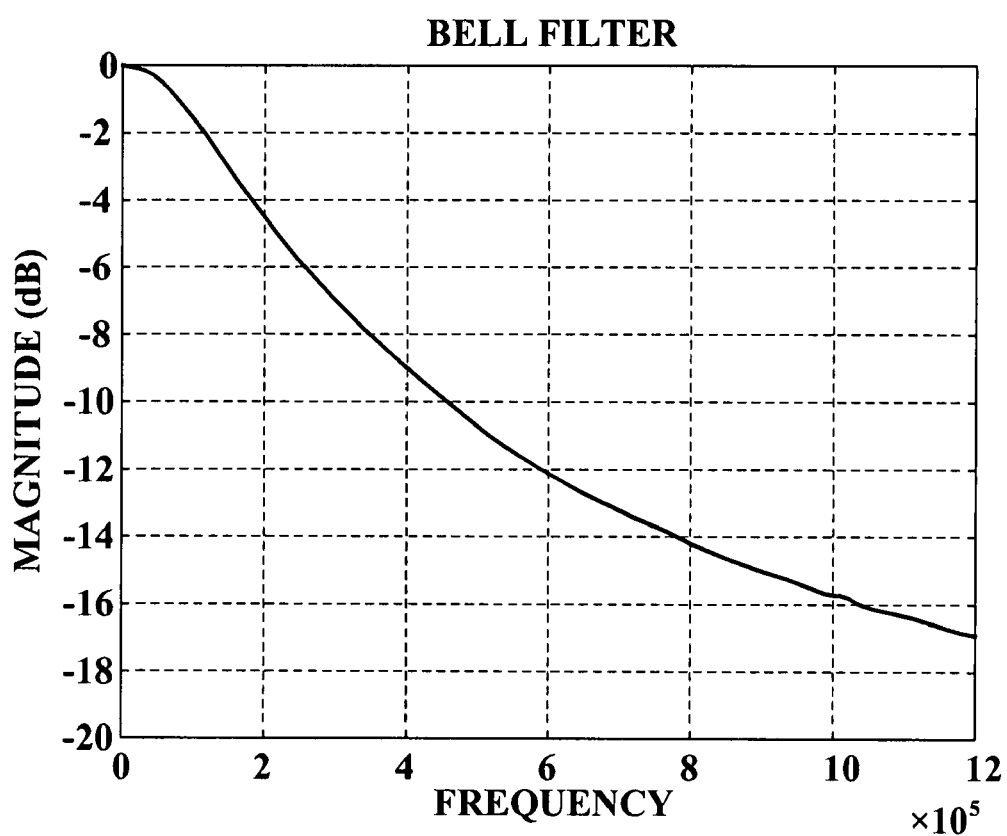
FIG. 4 is a graph illustrating a frequency response characteristic of a bell filter according to an exemplary embodiment of the present invention.

FIG. 4 is a graph illustrating a frequency response characteristic of a bell filter according to an exemplary embodiment of the present invention.

As shown in FIG. 4, in operation S230, the bell filter 130 may eliminate a gain component, G/2, from the I signal and the Q signal acquired from the above Equation 10 and Equation 11, respectively, based on the frequency response characteristic of the bell filter 130 according to the present exemplary embodiment.

In operation S240, the frequency demodulator 140 calculates the phase difference between the neighboring samples by using the arctangent approximation with respect to the bell-filtered signal. Also, the frequency demodulator may include the phase differentiator 141 and the phase estimator 142. The phase differentiator 141 calculates a phase difference component between the neighboring samples, based on multiplication of a first sample and a conjugate complex number of a second sample. In this instance, the first sample and the second sample correspond to the neighboring samples, and the second sample delays the first sample. Also, the phase estimator 142 calculates the phase difference between the neighboring samples by using the arctangent approximation, based on the calculated phase difference component. A method of calculating the phase difference may include a method of using polar coordinates, which will be described with reference to FIG. 5.

Figure 5:
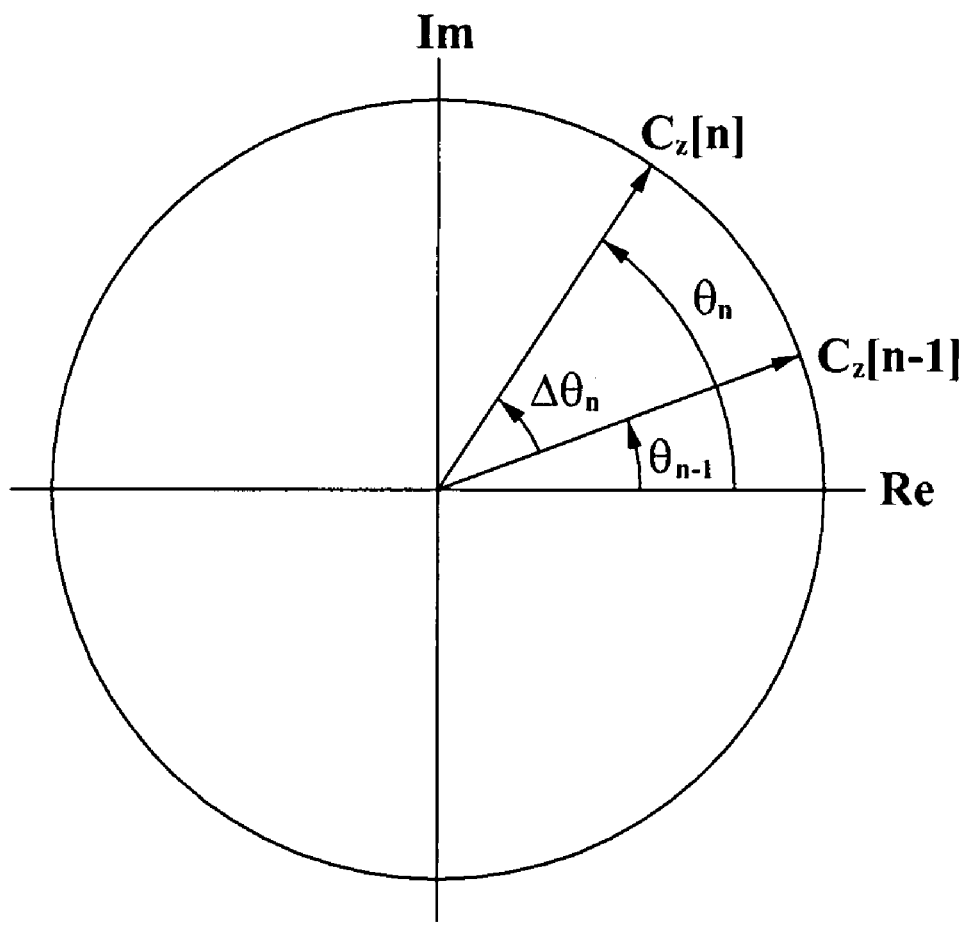
FIG. 5 illustrates a phase difference between samples using polar coordinates according to an exemplary embodiment of the present invention.

FIG. 5 illustrates a phase difference between samples using polar coordinates according to an exemplary embodiment of the present invention.

As shown in FIG. 5, when information between neighboring samples according to the present exemplary embodiment are indicated as $C_z[n]$ and $C_z[n-1]$, they may be represented as complex numbers given by $$C_z[n]=e^{j\theta_n}$$

$$C_z[n-1]=e^{j\theta_{n-1}}$$ Equation 12

$C_z[n]$ outputted from the bell filter 130 exists on a complex number plane which is a sum of a real number portion represented by the above Equation 10, and an imaginary number portion represented by the above Equation 11. Hereinafter, an operational principle of a phase differentiator of calculating a phase difference component $e^{j\Delta\theta_N}$ based on $C_z[n]$ and $C_z[n-1]$ will be described with reference to FIG. 6.

Figure 6:
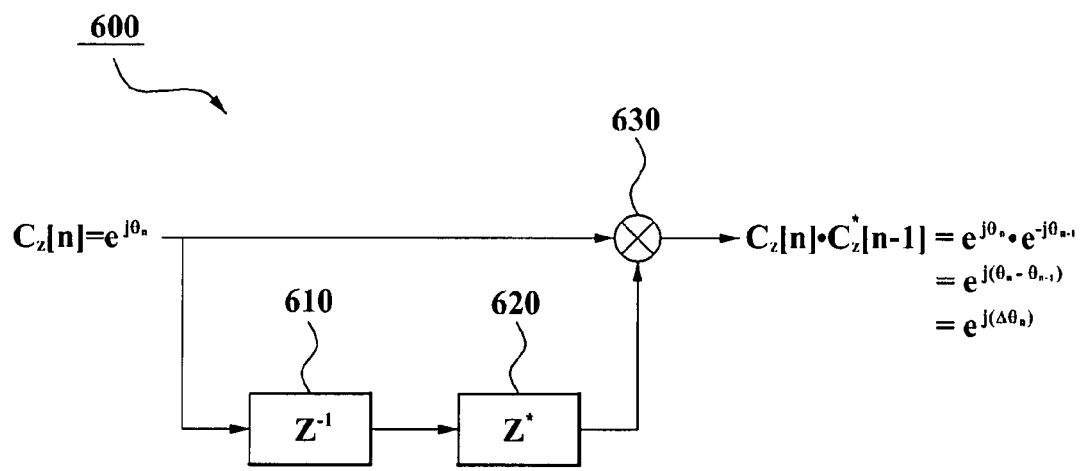
FIG. 6 illustrates an example of an operational principle of a phase differentiator according to an exemplary embodiment of the present invention.

FIG. 6 illustrates an example of an operational principle of a phase differentiator 600 according to an exemplary embodiment of the present invention.

As shown in FIG. 6, the phase differentiator 600 according to the present exemplary embodiment includes a delay line 610, a conjugator 620, and a multiplier 630. The delay line 610 outputs $C_z[n-1]$ by delaying $C_z[n]$, and the conjugator 620 outputs a conjugate complex number of $C_z[n-1]$, that is, $C_z^*[n-1]$. Next, the multiplier 630 multiplies $C_z[n]$ and $C_z^*[n-1]$ and then outputs $e^{j\Delta\theta_N}$, which may be represented as a complex number given by $$e^{j\Delta\theta_n}=e^{j(\theta_n-\theta_{n-1})}=\cos(\theta_n-\theta_{n-1})+j\sin(\theta_n-\theta_{n-1})$$ Equation 13.

When a real number portion and an imaginary number portion of the phase difference component are separated from the above Equation 13 indicated as the complex number, the real number portion and the imaginary number portion may be respectively represented as $$R_z=R_e\{e^{j\Delta\theta_N}\}=\cos(\theta_N-\theta_{N-1}),$$

$$I_z=Im\{e^{j\Delta\theta_N}\}=\sin(\theta_N-\theta_{N-1}).$$ Equation 14

Hereinafter, a configuration of a phase differentiator to acquire the above Equation 14 will be described with reference to FIG. 7.

Figure 7:
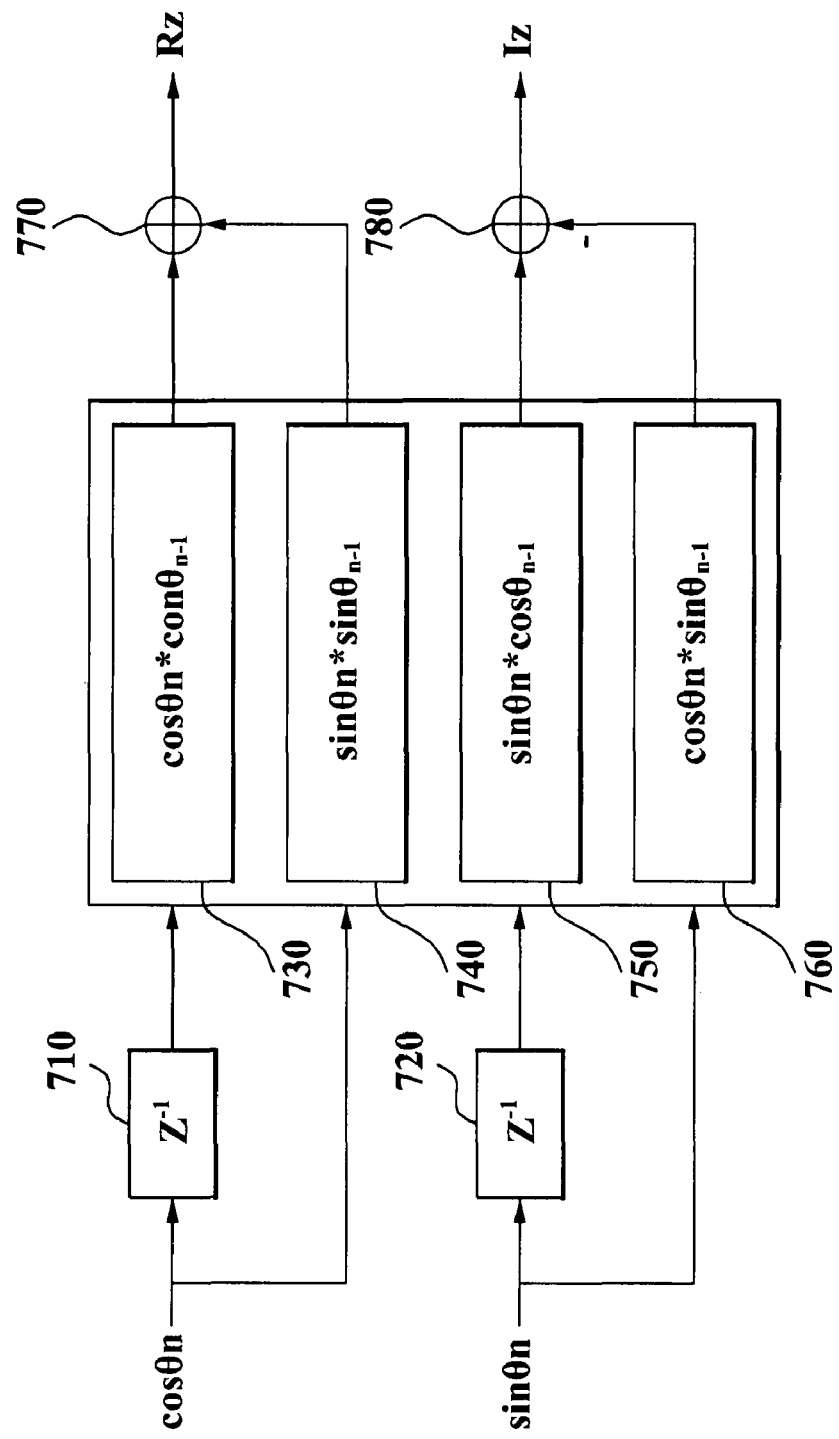
FIG. 7 illustrates a configuration of a phase differentiator according to an exemplary embodiment of the present invention.

FIG. 7 illustrates a configuration of a phase differentiator 700 according to an exemplary embodiment of the present invention.

As shown in FIG. 7, the phase differentiator 700 includes a first delay line 710, a second delay line 720, a first multiplier 730, a second multiplier 740, a third multiplier 750, a fourth multiplier 760, an adder 770, and a subtracter 780. The first delay line 710 outputs $\cos\theta_{N-1}$ by receiving and delaying $\cos\theta_N$ corresponding to a real number portion sample of $C_z[n]$, and the first multiplier 730 outputs $\cos\theta_N\cos\theta_{N-1}$ by multiplying $\cos\theta_N$ and $\cos\theta_{N-1}$. Also, the second delay line 720 outputs $\sin\theta_{N-1}$ by receiving and delaying $\sin\theta_N$ corresponding to an imaginary number portion sample of $C_z[n]$, and the second multiplier 740 outputs $\sin\theta_N\sin\theta_{N-1}$ by multiplying $\sin\theta_N$ and $\sin\theta_{N-1}$. Also, the adder 770 outputs $R_z=R_e\{e^{j\Delta\theta_N}\}=\cos(\theta_N-\theta_{N-1})$ by adding $\cos\theta_N\cos\theta_{N-1}$ and $\sin\theta_N\sin\theta_{N-1}$. Also, the third multiplier 750 outputs $\sin\theta_N\cos\theta_{N-1}$ by multiplying $\sin\theta_N$ and $\cos\theta_{N-1}$, and the fourth multiplier 760 outputs $\sin\theta_{N-1}\cos\theta_N$ by multiplying $\sin\theta_{N-1}$ and $\cos\theta_N$. Also, the subtracter 780 outputs $I_z=Im\{e^{j\Delta\theta_N}\}=\sin(\theta_N-\theta_{N-1})$ by subtracting $\sin\theta_{N-1}\cos\theta_N$ from $\sin\theta_N\sin\theta_{N-1}$.

The phase differentiator 700 may generate $R_z=R_e\{e^{j\Delta\theta_N}\}=\cos(\theta_N-\theta_{N-1})$ corresponding to the real number portion and $I_z=Im\{e^{j\Delta\theta_N}\}=\sin(\theta_N-\theta_{N-1})$ corresponding to the imaginary number portion, which indicate the phase difference component.

Also, in order to acquire the phase difference $\Delta\theta_n$, Equation 15 and Equation 16 below may be represented by using the real number portion and the imaginary portion.

$$\frac{I_z}{R_z}=\frac{\sin(\theta_n-\theta_{n-1})}{\cos(\theta_n-\theta_{n-1})}=\tan(\theta_n-\theta_{n-1})$$ [Equation 15]

$$\Delta\theta_n=\theta_n-\theta_{n-1}=\arctan\left(\frac{I_z}{R_z}\right)$$ [Equation 16]

In this instance, $\theta_n$ indicates phase information of the above Equation 10 and Equation 11, and may be given by $$\theta_n=2\pi(f_0-f_{OR})n+m[n].$$ Equation 17

When the above Equation 17 is arranged, the phase difference $\Delta\theta_n$ may be represented as $$\Delta\theta_n=\theta_n-\theta_{n-1}=2\pi(f_0-f_{OR})+m[n]-m[n-1] \Rightarrow m[n]-m[n-1]=\Delta\theta_n-2\pi(f_0-f_{OR})$$ Equation 18

From the above Equation 6, the chrominance signal corresponding to an original signal may be represented as $$m(t)=2\pi\Delta f_{OR}\int_0^t D_R^* dt$$ [Equation 19]

$$\Rightarrow D_R^*[n]=\frac{1}{2\pi\Delta f_{OR}}(m[n]-m[n-1]).$$

When the above Equation 18 is substituted for the above Equation 19, it may be represented as $$D_R^*[n]=\frac{1}{2\pi\Delta f_{OR}}(\Delta\theta_n-2\pi(f_0-f_{OR})).$$ [Equation 20]

When the phase difference $\Delta\theta_n$ is acquired, the frequency modulated chrominance signal $D_R^*[n]$ can be acquired.

In this instance, an arctangent needs to be calculated to acquire the phase difference $\Delta\theta_n$. In an exemplary embodiment of the present invention, the arctangent approximation is utilized. When utilizing the arctangent approximation, the phase difference $\Delta\theta_n$ may be represented as Equation 21 below. Specifically, in comparison to a general sampling frequency, the chrominance signal has a significantly low frequency component. Specifically, in the above Equation 15, the size of $I_z/R_z$ is too small and thus an $\arctan(I_z/R_z)$ value exists in a linear portion and the arctangent approximation may be utilized.

$$\Delta\theta_n=\arctan\left(\frac{I_z}{R_z}\right)\approx\frac{I_z}{R_z}$$ [Equation 21]

Due to the arctangent approximation, the phase difference may be acquired by using only a divide operation. The arctangent approximation may avoid a floating point operation which is relatively difficult to readily realize in hardware, and may perform a fixed-point operation which is relatively simple to realize in hardware.

In operation S250, the DC compensation unit 150 eliminates the DC offset from the calculated phase difference, that is, the frequency demodulated chrominance signal $D_R^*[n]$. In operation S260, the DEF 160 performs the inverse process of the low frequency pre-emphasis filter of the transmitting side, and eliminates the high frequency component by de-emphasis filtering the chrominance signal in which the DC offset is eliminated by the DC compensation unit 150. Hereinafter, the frequency response characteristic of the DEF 160 will be described with reference to FIG. 8.

Figure 8:
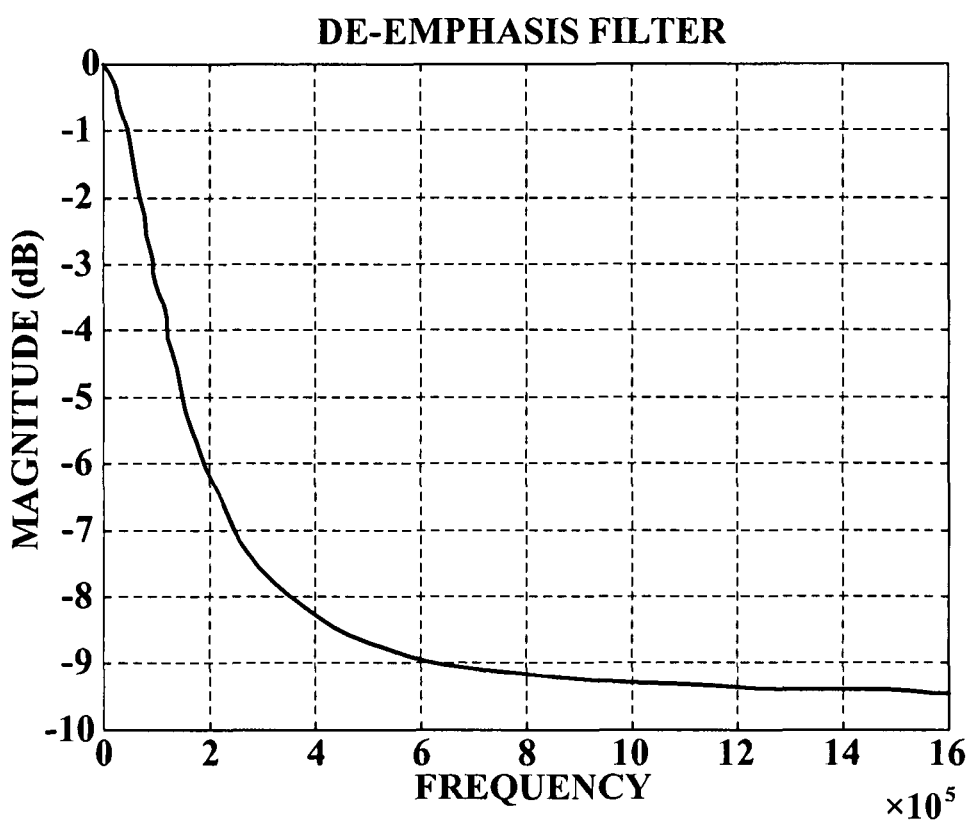
FIG. 8 is a graph illustrating a frequency response characteristic of a de-emphasis filter according to an exemplary embodiment of the present invention.

FIG. 8 is a graph illustrating a frequency response characteristic of a de-emphasis filter according to an exemplary embodiment of the present invention.

As shown in FIG. 8, based on the frequency response characteristic of the DEF 160 according to the present exemplary embodiment of the present invention, the DEF 160 outputs the original chrominance signal $D_R$ by eliminating the high frequency component from the signal in which the DC offset is eliminated by the DC compensation unit 150. In this instance, the original chrominance signal $D_R$ may be represented as $$D_R = A_{BF}^{-1}(f) D_R^*.\qquad\text{Equation 22}$$

Consequently, the switch 170 includes a separate line buffer to alternatively output the chrominance signal by a predetermined pixel unit, for example, by one pixel unit, so that chrominance signals of $D_R$ and $D_B$ lines may be simultaneously provided by each line unit. In this instance, a crossover switch may be utilized for the switch 170.

The SECAM chrominance signal demodulation method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, there is provided a frequency demodulator and method of demodulating a SECAM chrominance signal which can utilize both a real number portion and an imaginary number portion, and generate a frequency-demodulated chrominance signal using an arctangent approximation, and thereby can simplify a circuit configuration of a frequency demodulator to perform a fixed-point calculation.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A frequency demodulator for recovering a chrominance signal, the frequency demodulator comprising:
a phase differentiator generating a phase difference component between neighboring samples from an input signal; and
a phase estimator calculating a phase difference between the neighboring samples by using an arctangent approximation, based on the generated phase difference component,
wherein the frequency demodulator generates a frequency-demodulated chrominance signal and the phase difference corresponds to the chrominance signal,
wherein the phase differentiator comprises:
a first delay line generating a first delayed sample by delaying a real number portion sample of the input signal;
a first multiplier generating a first multiplication result by multiplying the real number portion sample and the first delayed sample;
a second delay line generating a second delayed sample by delaying an imaginary number portion sample of the input signal;
a second multiplier generating a second multiplication result by multiplying the imaginary number portion sample and the second delayed sample;
a summator generating a real number portion of the phase difference component by summing the first multiplication result and the second multiplication result;
a third multiplier generating a third multiplication result by multiplying the first delayed sample and the imaginary number portion sample;
a fourth multiplier generating a fourth multiplication result by multiplying the second delayed sample and the real number portion sample; and
a subtracter generating an imaginary number portion of the phase difference component by calculating a difference between the third multiplication result and the fourth multiplication result.

2. The frequency demodulator of claim 1, wherein the phase difference is calculated by dividing an imaginary number portion of the phase difference component by a real number portion of the phase difference component.

3. The frequency demodulator of claim 1, wherein the phase differentiator comprises:
a delay line delaying a first sample of the input signal;
a conjugator generating a second sample corresponding to a conjugate complex number of the delayed first sample; and
a multiplier outputting the phase difference component by multiplying the first sample and the second sample.

4. The frequency demodulator of claim 1, wherein the chrominance signal is based on a sequential color with memory (SECAM) scheme.

5. The frequency demodulator of claim 1, wherein the input signal is any one of a first chrominance signal and a second chrominance signal which are alternatively extracted from a SECAM composite video baseband signal (CVBS) for each scanning line.

6. A frequency demodulation method of demodulating a chrominance signal, the method comprising:
generating a phase difference component between neighboring samples from an input signal; and
calculating a phase difference between the neighboring samples by using arctangent approximation, based on the generated phase difference component,
wherein the frequency demodulation method generates a frequency-demodulated chrominance signal and the phase difference corresponds to the chrominance signal,
wherein the generating of the phase difference components comprises:
generating a first delayed sample by delaying a real number portion sample of the input signal;

generating a first multiplication result by multiplying the real number portion sample and the first delayed sample;

generating a second delayed sample by delaying an imaginary number portion sample of the input signal;

generating a second multiplication result by multiplying the imaginary number portion sample and the second delayed sample;

generating a real numb portion of the phase difference component by summing the first multiplication result and the second multiplication result;

generating a third multiplication result by multiplying the first delayed sample and the imaginary number portion sample;

generating a fourth multiplication result by multiplying the second delayed sample and the real number portion sample; and generating an imaginary number portion of the phase difference component by calculating a difference between the third multiplication result and the fourth multiplication result.

7. The method of claim 6, wherein the phase difference is calculated by dividing an imaginary number portion of the phase difference component by a real number portion of the phase difference component.

8. The method of claim 6, wherein the generating of the phase difference component comprises:

delaying a first sample of the input signal;

generating a second sample corresponding to a conjugate complex number of the delayed first sample; and outputting the phase difference component by multiplying the first sample and the second sample.

9. The method of claim 6, wherein the chrominance signal is based on a SECAM scheme.

10. The method of claim 6, wherein the input signal is any one between a first chrominance signal and a second chrominance signal which are alternatively extracted from a SECAM CVBS for each scanning line.

11. A non-transitory computer-readable recording medium storing a program for implementing the method of claim 6.

* * * * *